US012316627B2

(12) United States Patent
Yoo

(10) Patent No.: US 12,316,627 B2
(45) Date of Patent: May 27, 2025

(54) SMART CARD DEVICE, DEVICE FOR GENERATING VIRTUAL CODE FOR AUTHENTICATION, METHOD OF GENERATING VIRTUAL CODE FOR AUTHENTICATION USING THE SAME, AND SERVER FOR VERIFYING VIRTUAL CODE FOR AUTHENTICATION

(71) Applicant: SSENSTONE INC., Seoul (KR)

(72) Inventor: Chang-Hun Yoo, Seoul (KR)

(73) Assignee: SSENSTONE INC., Seoul (KR)

(*) Notice: Subject to any disclaimer, the term of this patent is extended or adjusted under 35 U.S.C. 154(b) by 273 days.

(21) Appl. No.: 17/741,430

(22) Filed: May 10, 2022

(65) Prior Publication Data
US 2022/0286449 A1 Sep. 8, 2022

Related U.S. Application Data

(63) Continuation of application No. PCT/KR2022/002954, filed on Mar. 2, 2022.

(30) Foreign Application Priority Data

Mar. 4, 2021 (KR) .................. 10-2021-0029035
Feb. 18, 2022 (KR) .................. 10-2022-0021278

(51) Int. Cl.
H04L 9/40 (2022.01)
(52) U.S. Cl.
CPC ...... H04L 63/0853 (2013.01); H04L 63/0838 (2013.01); H04L 63/20 (2013.01)
(58) Field of Classification Search
CPC . H04L 63/0853; H04L 63/0838; H04L 63/20; H04L 41/28; H04L 69/24
See application file for complete search history.

(56) References Cited

U.S. PATENT DOCUMENTS

2017/0330188 A1* 11/2017 Canh .................. H04L 63/0838
2020/0051065 A1 2/2020 Yoo
(Continued)

FOREIGN PATENT DOCUMENTS

JP 2008-027381 A 2/2008
JP 2013-084032 A 5/2013
(Continued)

OTHER PUBLICATIONS

Office Action issued in KR 10-2022-0021278; mailed by the Korean Intellectual Property Office on Jul. 8, 2022.
(Continued)

Primary Examiner — Esther B. Henderson
(74) Attorney, Agent, or Firm — Studebaker Brackett PLLC

(57) ABSTRACT

Provided are a smart card device, a device for generating a virtual code for authentication, a method of generating a virtual code for authentication using the same, and a server for verifying a virtual code for authentication. The method includes transmitting time data to a card upon tagging of the card in which an IC chip has been embedded, receiving, from the card, a virtual code for primary authentication generated based on the time data, generating a virtual code for secondary authentication by using the virtual code for primary authentication, transmitting at least one of the virtual code for primary authentication and the virtual code for secondary authentication to a server, and requesting the server to perform verification on the at least one.

9 Claims, 8 Drawing Sheets

(56) References Cited

U.S. PATENT DOCUMENTS

| | | |
|---|---|---|
| 2020/0051075 A1 | 2/2020 | Yoo |
| 2020/0320526 A1 | 10/2020 | Yoo |
| 2020/0410476 A1 | 12/2020 | Yoo |
| 2021/0065163 A1 | 3/2021 | Yoo |
| 2021/0157931 A1 | 5/2021 | Yoo |
| 2021/0185034 A1 | 6/2021 | Yoo |
| 2021/0365921 A1 | 11/2021 | Yoo |
| 2021/0390543 A1 | 12/2021 | Yoo |
| 2022/0109985 A1 | 4/2022 | Yoo |

FOREIGN PATENT DOCUMENTS

| | | | |
|---|---|---|---|
| JP | 2016-103260 A | 6/2016 | |
| JP | 2018-506102 A | 3/2018 | |
| KR | 10-1272600 B1 | 6/2013 | |
| KR | 101316466 B1 | 10/2013 | |
| KR | 10-2015-0011933 A | 2/2015 | |
| KR | 10-1561499 B1 | 10/2015 | |
| KR | 10-1788149 B1 | 10/2017 | |
| KR | 10-2073883 B1 | 3/2020 | |
| KR | 10-2020-0062102 A | 6/2020 | |
| KR | 10-2021-0022018 A | 3/2021 | |
| WO | WO-2016085062 A1 * | 6/2016 | ............ G06Q 20/34 |
| WO | 2020/032498 A1 | 2/2020 | |
| WO | 2021/003137 A1 | 1/2021 | |

OTHER PUBLICATIONS

"Notice of Reasons for Refusal" Office Action issued in JP 2022-572460; mailed by the Japanese Patent Office on Dec. 12, 2023.
Extended European Search Report issued in EP 24 19 4754.8 by the European Patent Office on Oct. 17, 2024, which is related to U.S. Appl. No. 17/741,430.

* cited by examiner

SMART CARD DEVICE, DEVICE FOR GENERATING VIRTUAL CODE FOR AUTHENTICATION, METHOD OF GENERATING VIRTUAL CODE FOR AUTHENTICATION USING THE SAME, AND SERVER FOR VERIFYING VIRTUAL CODE FOR AUTHENTICATION

TECHNICAL FIELD

The present disclosure relates to a smart card device, a device for generating a virtual code for authentication, a method of generating a virtual code for authentication using the same, and a server for verifying a virtual code for authentication.

BACKGROUND ART

Code form data is used in many areas. An IPIN number, a social security number, etc. for user identification in addition to a card number and an account number used upon payment are code form virtual code generation devices for data authentication.

However, many accidents in which such code data is leaked in a process of the code data being used occurs. The card number is visually leaked to others because an actual card number is written in a surface of a card as it is. Upon payment using a magnetic property, the card number is leaked as the card number is transferred to a POS device as it is.

Many attempts to use a virtual code have been made in order to prevent an actual code from being leaked as it is, but data for identifying a user is required in order to search for the actual code corresponding to the virtual code.

However, a one-time password (OTP) is accompanied by inconvenience because a separate OTP generation device is required. In particular, a user terminal has a weak point in security because seed data used to generate an OTP is leaked.

Accordingly, there is a need for a scheme for generating an OTP code like generating a virtual security code necessary for user authentication based on card data of cards owned by many users, but simultaneously preventing seed data from being leaked without a need for a separate OTP generation device.

DISCLOSURE

Technical Problem

An object to be solved by the present disclosure is to provide a smart card device, a device for generating a virtual code for authentication, a method of generating a virtual code for authentication using the same, and a server for verifying a virtual code for authentication.

Objects to be solved by the present disclosure are not limited to the aforementioned objects, and the other objects not described above may be evidently understood from the following description by those skilled in the art.

Technical Solution

A method of generating a virtual code for authentication, which is performed by a device for generating a virtual code for authentication according to an aspect of the present disclosure for solving the aforementioned object, includes transmitting time data to a card upon tagging of the card in which an IC chip has been embedded, receiving, from the card, a virtual code for primary authentication generated based on the time data, generating a virtual code for secondary authentication by using the virtual code for primary authentication, transmitting at least one of the virtual code for primary authentication and the virtual code for secondary authentication to a server, and requesting the server to perform verification on the at least one.

In the present disclosure, the virtual code for primary authentication may include a plurality of codes, a first code of the plurality of codes may be generated based on the time data and a first OTP, and a second code of the plurality of codes may be generated by excluding, from the first code, first user identification (UID), that is, identification information of the card.

In the present disclosure, generating the virtual code for secondary authentication generating the virtual code for secondary authentication may include generating a third code by excluding, from the first code, second UID, that is, identification information of the device for generating a virtual code for authentication, and generating the virtual code for secondary authentication by combining the first code, the second code, and the third code.

In the present disclosure, verification may be performed on the card based on the first code and the second code, and verification may be performed on the device for generating a virtual code for authentication based on the first code and the third code.

In the present disclosure, generating the virtual code for secondary authentication may include generating a second OTP based on the virtual code for primary authentication, and generating the virtual code for secondary authentication based on the second OTP and second UID, that is, identification information of the device for generating a virtual code for authentication.

In the present disclosure, the virtual code for secondary authentication may be verified by comparing the second OTP included in the virtual code for secondary authentication and a second OTP for verification, and the second OTP for verification may be generated by the server based on seed data identical with seed data used when the second OTP is generated.

In the present disclosure, the virtual code for primary authentication may be used for user authentication upon offline access control and online login.

In the present disclosure, the virtual code for secondary authentication may be used for user authentication upon financial settlement.

In the present disclosure, the time data has a form combined with an application protocol data unit (APDU) command.

A smart card device according to another aspect of the present disclosure for solving the aforementioned object includes an NFC module configured to receive time data from a device for generating a virtual code for authentication through card tagging, and an IC module configured to generate a virtual code for primary authentication based on the received time data. The virtual code for primary authentication is autonomously transmitted and used for user authentication or is used to generate a virtual code for secondary authentication, the virtual code for secondary authentication is generated by the device for generating a virtual code for authentication by using the virtual code for primary authentication, and at least one of the virtual code for primary authentication and the virtual code for secondary authentication is transmitted from the device for generating a virtual code for authentication to a server so that the server performs verification on the virtual code for primary authentication and the virtual code for secondary authentication.

A device for generating a virtual code for authentication according to still another aspect of the present disclosure for solving the aforementioned object includes a communication unit configured to transmit time data to a card upon tagging of the card in which an IC chip has been embedded and receive, from the card, a virtual code for primary authentication generated based on the time data, a code generation unit configured to generate a virtual code for secondary authentication by using the virtual code for primary authentication, and a verification request unit configured to request the server to perform verification on at least one of the virtual code for primary authentication and the virtual code for secondary authentication by transmitting the at least one to the server through the communication unit.

A method of verifying a virtual code for authentication, which is performed by a server according to still another aspect of the present disclosure for solving the aforementioned object, includes receiving at least one of a virtual code for primary authentication and a virtual code for secondary authentication from a device for generating a virtual code for authentication, and performing verification on at least one of the virtual code for primary authentication and the virtual code for secondary authentication. If the virtual code for secondary authentication may include a plurality of codes, performing the verification includes extracting first user identification (UID), that is, identification information of a card, based on a first code and second code of the plurality of codes and performing verification on the card, and extracting second UID, that is, identification information of the device for generating a virtual code for authentication based on the first code and third code of the plurality of codes and performing verification on the device for generating a virtual code for authentication.

In the present disclosure, if the virtual code for secondary authentication includes a second OTP and the second UID, performing the verification may include generating a second OTP for verification based on seed data identical with seed data used when the second OTP is generated, comparing the second OTP included in the virtual code for secondary authentication and the second OTP for verification, and completing the verification on the card and the device for generating a virtual code for authentication when the second OTP and the second OTP for verification are identical with each other.

In the present disclosure, when the virtual code for primary authentication is received, performing the verification may include extracting the first user identification (UID) which is the identification information of the card based on the virtual code for primary authentication and performing the verification on the card by using a first verification algorithm.

In addition, another method and another system for embodying the present disclosure and a computer-readable recording medium on which a computer program for executing the method may be further provided.

Advantageous Effects

According to the present disclosure, a virtual security code necessary for user authentication can be generated by using time data obtained based on an NFC method even without a separate OTP device because the device for generating a virtual code for authentication provides the smart card device with the time data upon card tagging.

When the smart card device is tagged on the device for generating a virtual code for authentication, in order to prevent the capture of data when the corresponding data is transmitted and received between the two devices, the device for generating a virtual code for authentication can newly generate a virtual code for secondary authentication by re-processing a virtual code for primary authentication generated by the smart card device.

Furthermore, a security level can be different depending on a situation because user authentication is performed through the verification of a virtual code for primary authentication in an offline access control or online login situation and user authentication is performed through the verification of a virtual code for secondary authentication, which is generated by using the virtual code for primary authentication, in a financial settlement situation.

Furthermore, a financial card (a personal card or a company card) can also be expanded and used as an access card for a company because the smart card device can be applied to both an offline access control situation and a financial settlement situation.

Effects of the present disclosure are not limited to the aforementioned effects, and effects not described above may be evidently understood from the following description by those skilled in the art.

DETAILED DESCRIPTION

Figure 1:
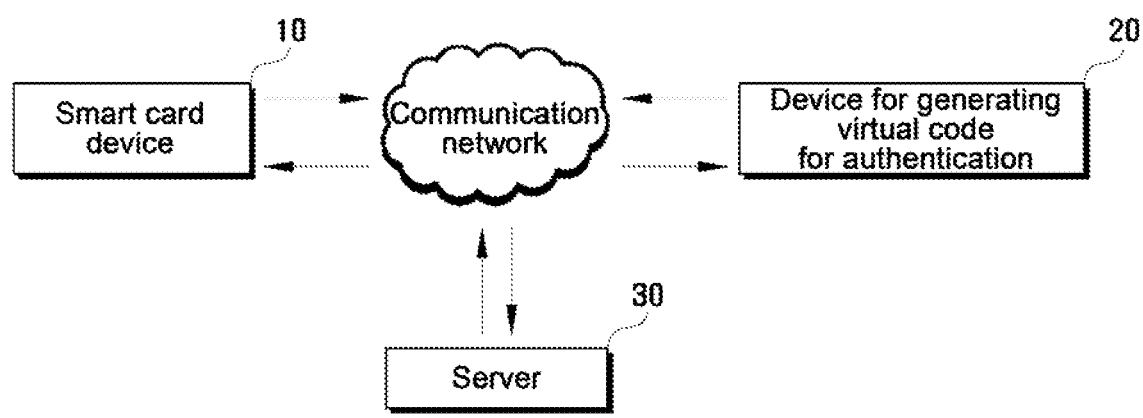
FIG. 1 is a configuration diagram of a user authentication system based on a virtual code for authentication according to the present disclosure.

Advantages and characteristics of the present disclosure and a method for achieving the advantages and characteristics will become apparent from the embodiments described in detail in conjunction with the accompanying drawings. However, the present disclosure is not limited to the disclosed embodiments, but may be implemented in various different forms. The embodiments are provided to only complete the present disclosure and to fully notify a person having ordinary knowledge in the art to which the present disclosure pertains of the category of the present disclosure. The disclosure is defined by the category of the claims.

Terms used in this specification are for describing embodiments and are not intended to limit the present disclosure. In this specification, an expression of the singular number includes an expression of the plural number unless specially mentioned in the context. The term "comprises" and/or "comprising" used in this specification does not exclude the presence or addition of one or more other elements in addition to a mentioned element. The same reference numerals refer to the same elements throughout the specification. "and/or" includes each of mentioned elements and all combinations of one or more of the mentioned elements. Although the terms "first", "second", etc. are used to describe various elements, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms used and defined in common dictionaries are not construed as being ideal or excessively formal unless specially defined otherwise.

Prior to a description, the meanings of terms used in this specification are described in brief. However, it is to be noted that the description of a term is for helping understanding of this specification and is not used as a meaning that limits the technical spirit of the present disclosure if the term is not described as contents that explicitly limit the present disclosure.

In this specification, a "letter" is a component that constitutes a code, and includes all or some of a capital alphabetical letter, a lower case alphabetical letter, a number, and a special letter.

In this specification, a "code" means a letter string in which letters are listed.

In this specification, a "one-time password (OTP)" is a random code that is temporarily generated for user authentication and changed every unit time, and may include a specific digit number of codes composed of letters.

In this specification, a "virtual code for authentication" is a code generated by means for generating a virtual code for authentication, and means a code verified in means for verifying a virtual code for authentication. That is, the "virtual code for authentication" means a virtual code temporarily assigned every unit count so that verification can be performed. In this case, the means for generating a virtual code for authentication may be a smart card device or may be a device for generating a virtual code for authentication according to an embodiment, but the present disclosure is not limited thereto.

In this specification, a "detailed code" means some codes included in a virtual code for authentication.

In this specification, a "unit count" is set at a specific time interval, and is a unit defined to be changed as a time interval elapses. For example, 1 count may be set and used as a specific time interval (e.g., 1.5 second).

In this specification, a "virtual code generation function for authentication" means a function that is used to generated a virtual code for authentication.

In this specification, a "user" may be a user who accesses a specific space (offline or online space) that requires security by using a smart card device or performs financial settlement by using the smart card device, but the present disclosure is not limited thereto.

In this specification, "user identification (UID)" means a value of a unique code form assigned to identify a user in a way to be not overlapped for each user.

In this specification, "time data" means time data at current timing. That is, all time data used for the generation of a virtual code for authentication and for verification may mean time data at the same timing.

Hereinafter, embodiments of the present disclosure are described in detail with reference to the accompanying drawings.

FIG. 1 is a configuration diagram of a user authentication system based on a virtual code for authentication according to the present disclosure.

Figure 2:
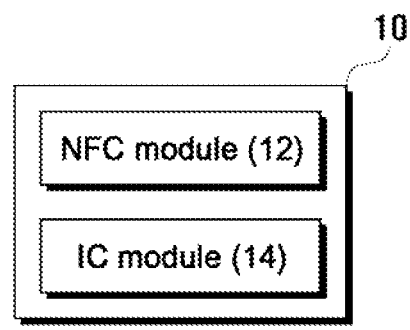
FIG. 2 is a schematic configuration diagram of a smart card device according to the present disclosure.

FIG. 2 is a schematic configuration diagram of a smart card device according to the present disclosure.

Figure 3:
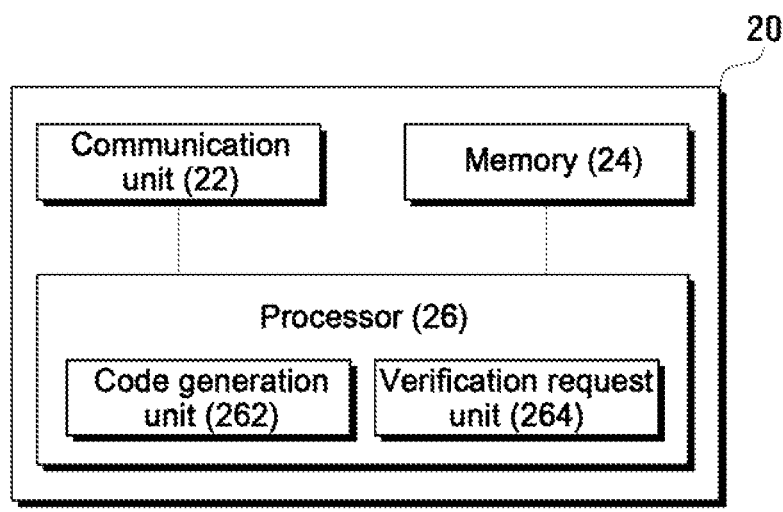
FIG. 3 is a schematic configuration diagram of a device for generating a virtual code for authentication according to the present disclosure.

FIG. 3 is a schematic configuration diagram of a device for generating a virtual code for authentication according to the present disclosure.

Figure 4:
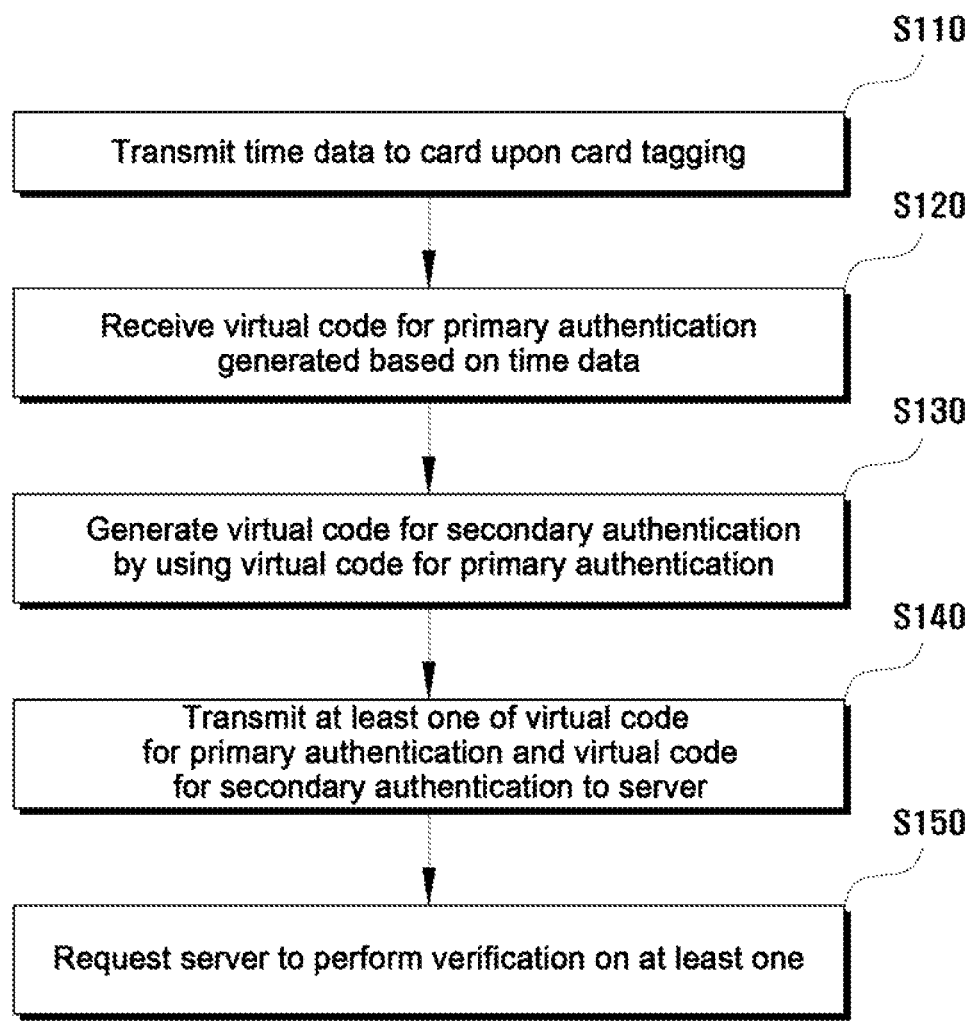
FIG. 4 is a flowchart of a method of generating a virtual code for authentication, which is performed by the device for generating a virtual code for authentication according to the present disclosure.

FIG. 4 is a flowchart of a method of generating a virtual code for authentication, which is performed by the device for generating a virtual code for authentication according to the present disclosure.

Figure 5:
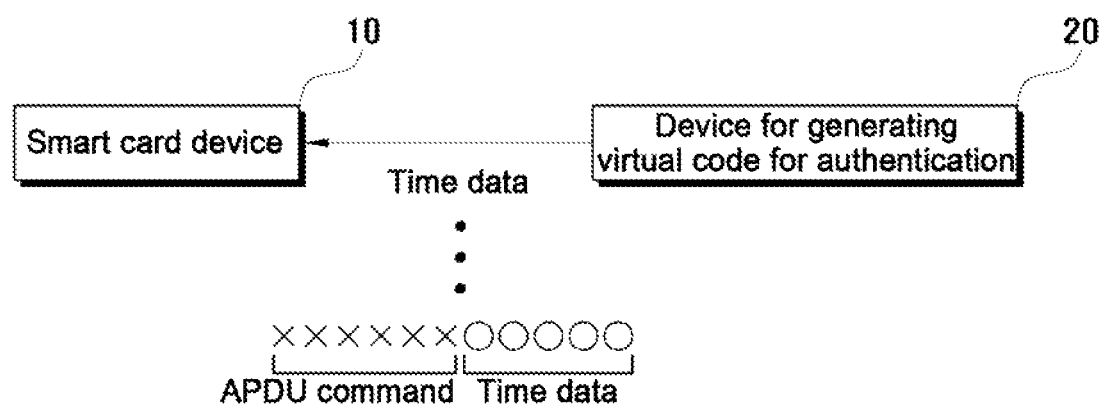
FIG. 5 is a diagram for describing time data according to the present disclosure.

FIG. 5 is a diagram for describing time data according to the present disclosure.

Figure 6:
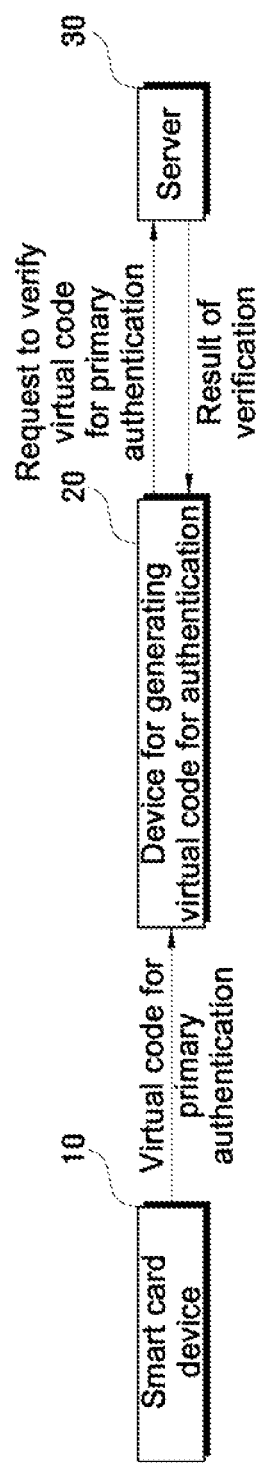
FIG. 6 is a diagram for describing the verification of a virtual code for primary authentication according to the present disclosure.

FIG. 6 is a diagram for describing the verification of a virtual code for primary authentication according to the present disclosure.

Figure 7:
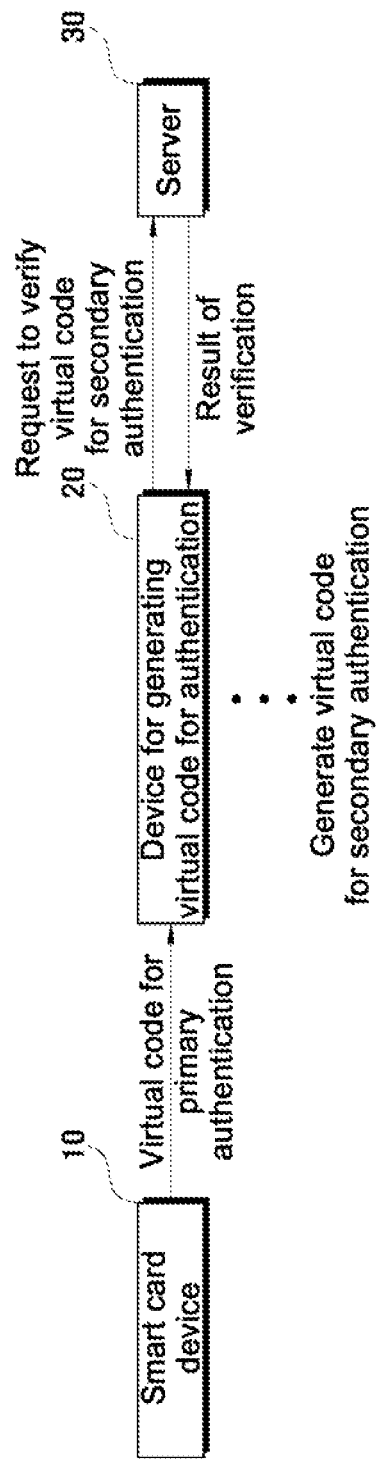
FIG. 7 is a diagram for describing the verification of a virtual code for secondary authentication according to the present disclosure.

FIG. 7 is a diagram for describing the verification of a virtual code for secondary authentication according to the present disclosure.

Figure 8:
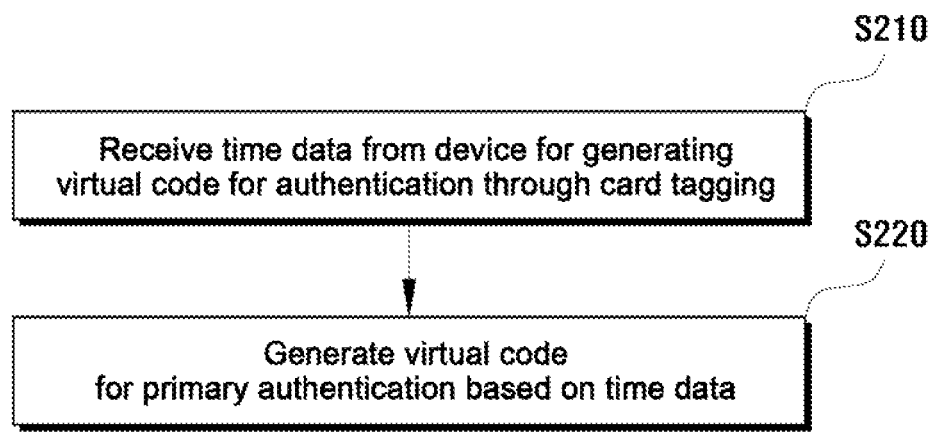
FIG. 8 is a flowchart of a method of generating a virtual code for authentication, which is performed by the smart card device, according to the present disclosure.

FIG. 8 is a flowchart of a method of generating a virtual code for authentication, which is performed by the smart card device, according to the present disclosure.

Referring to FIG. 1, the user authentication system (hereinafter referred to as a "system") based on a virtual code for authentication includes a control server 100, a smart card device 10, a device 20 for generating a virtual code for authentication, and a server 30. In this case, the system may include components more than or less than the components illustrated in FIG. 1.

The smart card device 10 means a real card that is used by a user. According to an embodiment, only some of information capable of identifying a card or a user may be indicated on a surface of the smart card device 10 or any information may not be indicated on a surface of the smart card device 10.

According to an embodiment, the smart card device 10 may be a card for access control and may be a card for financial settlement (e.g., a credit card, a check card, a cash card, or a company card).

Specifically, if the smart card device 10 is an access card for access control, the smart card device 10 may be used when a user accesses a specific space that requires security offline, or may be used when a user logs in to a specific website or an app online. If the smart card device 10 is a card for financial settlement, the smart card device 10 may be used when a user performs financial transactions. However, a form, type, and object of a card are not limited to those described above. The smart card device 10 is described in detail later.

The device 20 for generating a virtual code for authentication may be an access control device (e.g., a gate reader or a doorlock), and may be a user terminal that is used by a user. In this case, the user terminal is a given electronic device equipped with an application processor (AP) capable of driving an application. The user terminal includes a desktop computer that cannot be carried or a mobile device (e.g., a smart phone, a tablet PC, a personal digital assistant (PDA), an enterprise digital assistant (EDA), a portable multimedia player (PMP), a personal navigation device (PND), or a wearable device) that can be carried, and the present disclosure is not limited thereto. The device 20 for generating a virtual code for authentication is described in detail later.

The server 30 is means for verifying a virtual code for authentication, and performs verification on a virtual code for authentication, which is received from the device 20 for generating a virtual code for authentication. However, the present disclosure is not limited thereto. According to an embodiment, the device 20 for generating a virtual code for authentication may verify a virtual code for authentication instead of the server 30.

In this case, the server 30 may be a security-related server or a financial company server which communicates with the device 20 for generating a virtual code for authentication and communication, but the present disclosure is not limited thereto. Furthermore, referring to FIG. 1, the server 30 has been illustrated as being composed of one server, but may be composed in a system form in which a plurality of servers is associated with each other.

As illustrated in FIG. 1, the smart card device 10, the device 20 for generating a virtual code for authentication, and the server 30 may transmit and receive various data, signals, or information over a communication network.

In this case, various forms of communication networks may be used as the communication network. For example, wireless communication methods, such as a wireless LAN (WLAN), Wi-Fi, Wibro, Wimax, and high speed downlink packet access (HSDPA), or wired communication methods, such as Ethernet, xDSL (ADSL, VDSL), a hybrid fiber coax (HFC), fiber to the curb (FTTC), and a fiber to the home (FTTH), may be used as the communication network.

The communication network is not limited to the presented communication method, and may include all types of communication methods which have been widely known or are to be developed in the future in addition to the aforementioned communication methods.

Referring to FIG. 2, the smart card device 10 may include a narrow frequency communication (NFC) module 12 and an IC module 14. In this case, the smart card device 10 may include components more than or less than the components illustrated in FIG. 2.

The NFC module 12 (i.e., an NFC chip) is a communication module, and may transmit and receive various data to and from the device 20 for generating a virtual code for authentication. In this case, the NFC module 12 may be formed in an applet form, but the present disclosure is not limited thereto. When the smart card device 10 is tagged on the device 20 for generating a virtual code for authentication, the NFC module 12 may receive time data from the device 20 for generating a virtual code for authentication.

The IC module 14 (i.e., an IC chip) may generate a virtual code for primary authentication. In this case, the IC module 14 may be formed in an applet form, but the present disclosure is not limited thereto.

The IC module 14 may generate a virtual code for primary authentication by using received time data. Specifically, the IC module 14 may generate a virtual code for primary authentication by using card data and a virtual code generation function for authentication stored in a memory (not illustrated), in addition to received time data.

In this case, the card data may include user identification information of a user who has applied the issue of the corresponding smart card device 10 and card identification information. In this case, the card identification information may include a first user identification (UID) that is identification information of the smart card device 10, a secret, a card number, and a serial number, and the present disclosure is not limited thereto. The card identification information may include all types of card-related information. In this case, the user identification information may include a social security number, and the present disclosure is not limited thereto. The user identification information may include all types of user-related personal information.

A URL address of a company (e.g., a card fabrication company, a financial company, a security company, an online web or app service company) which issues and manages the smart card device 10 in addition to user identification information and card identification information may be stored in the IC module 14. For example, if a URL address of a specific financial company has been stored in the IC module 14 of the smart card device 10, when the corresponding smart card device 10 is tagged on the device 20 for generating a virtual code for authentication, the device 20 for generating a virtual code for authentication may obtain the URL address. In this case, the URL address may be related to installation information or execution information of a program or application of a corresponding financial company.

That is, various types of information in addition to user identification information and card identification information are stored in the IC module 14. When the smart card device 10 is tagged on the device 20 for generating a virtual code for authentication, the device 20 for generating a virtual code for authentication receives corresponding information among such various types of information from the smart card device 10.

The smart card device 10 may further include a processor (not illustrated) for controlling an overall operation of the smart card device 10. The processor (not illustrated) may process a signal, data, information, etc. inputted or outputted through the aforementioned components, or may drive a stored application program. In this case, the processor (not illustrated) has been described as a component different from the IC module 14, but the IC module 14 may perform the role of the processor (not illustrated) according to an embodiment.

Referring to FIG. 3, the device 20 for generating a virtual code for authentication may include a communication unit 22, a memory 24, and a processor 26. In this case, the device 20 for generating a virtual code for authentication may include components more than or less than the components illustrated in FIG. 3.

The communication unit 22 may transmit time data to the smart card device 10 over a communication network when the smart card device 10 is tagged on the device 20 for generating a virtual code for authentication, and may receive, from the smart card device 10, a virtual code for primary authentication generated based on the time data. In addition, the two devices may transmit and receive various data upon tagging.

The memory 24 may store data that supports various functions of the device 20 for generating a virtual code for authentication. The memory 24 may store multiple application programs or applications driven in the device 20 for generating a virtual code for authentication, and at least one process, data, or command for an operation of the device 20 for generating a virtual code for authentication. At least some of such application programs may be present for a basic function of the device 20 for generating a virtual code for authentication.

The processor 26 may generally control an overall operation of the device 20 for generating a virtual code for authentication in addition to an operation related to the application program. The processor 26 may provide or process information or a function suitable for the smart card device 10 or the server 30 by processing a signal, data, information, etc. inputted or outputted through the aforementioned components or driving an application program stored in the memory 24.

Furthermore, in order to drive an application program stored in the memory 24, the processor 26 may control at least some of the components described with reference to FIG. 3. Moreover, in order to drive the application program, the processor 26 may combine and operate at least two of the components included in the device 20 for generating a virtual code for authentication.

Referring to FIG. 3, the processor 26 may include a code generation unit 262 and a verification request unit 264. In this case, the processor 26 may include components more than or less than the components illustrated in FIG. 3.

The code generation unit 262 may generate a virtual code for secondary authentication by using a virtual code for primary authentication generated by the smart card device 10.

The verification request unit 264 may request the server to perform verification on at least one of the virtual code for primary authentication and the virtual code for secondary authentication by transmitting the at least one to the server through the communication unit 22.

Although not illustrated in FIG. 3, the processor 26 may further include components performing various calculation operations, determination operations, etc., in addition to the code generation unit 262 and the verification request unit 264.

Hereinafter, a user authentication method based on a virtual code for authentication, which is performed by the device 20 for generating a virtual code for authentication, is described in detail with reference to FIGS. 4 to 7.

Referring to FIG. 4, when a card in which an IC chip has been embedded is tagged, the communication unit 22 of the device 20 for generating a virtual code for authentication may transmit time data to the smart card device 10 (S110).

The smart card device 10 may receive the time data from the device 20 for generating a virtual code for authentication through tagging because the smart card device cannot autonomously obtain the time data.

In this case, the time data may have a form combined with an application protocol data unit (APDU) command Referring to FIG. 5, the time data may be transferred to the smart card device 10 in a form combined behind the APDU command. However, the combination form is not limited thereto.

The communication unit 22 of the device 20 for generating a virtual code for authentication may receive, from the smart card device 10, a virtual code for primary authentication generated based on the time data (S120).

That is, the smart card device 10 may receive the time data, may generate a virtual code for primary authentication by using the received time data and card data (e.g., a secret and first UID) stored in the card, and may transfer the virtual code for primary authentication to the device 20 for generating a virtual code for authentication.

The virtual code for primary authentication may include a first code and a second code. In this case, the first code and the second code are detailed codes of the virtual code for primary authentication. The virtual code for primary authentication may include a larger number of detailed codes in addition to the first code and the second code.

The first code of the virtual code for primary authentication may be generated based on the time data and a first OTP. First, the smart card device 10 may generate the first OTP by using, as seed data, a secret value stored in the card and the time data by using a first function for generating a virtual code for authentication. In this case, according to an embodiment, a value other than the secret value and the time data may be further used as the seed data.

Thereafter, the smart card device 10 may generate the first code by adding the generated first OTP to the received time data by using the first function for generating a virtual code for authentication.

The smart card device 10 may generate the second code by excluding first user identification (UID), that is, identification information of the card, from the first code by using the first function for generating a virtual code for authentication. In this case, the first UID is data stored in the smart card device 10, and is a unique value capable of identifying the smart card device 10.

The first code=the time data+the first OTP

The second code=the first code−the first UID

The smart card device 10 may generate the virtual code for primary authentication by combining the generated detailed codes (the first code and the second code). As an embodiment, the smart card device 10 may generate the virtual code for primary authentication by combining a plurality of detailed codes according to a specific rule by using the first function for generating a virtual code for authentication. The first function for generating a virtual code for authentication may include a rule (i.e., a detailed code combination function) in which a plurality of detailed codes is combined.

Various methods may be applied as a method of generating one virtual code for authentication by combining a plurality of detailed codes. As an example of the detailed code combination function, the smart card device 10 may generate a virtual code for authentication in a way to alternately dispose the first code having M digits and the second code having N digits. Furthermore, as another example, the detailed code combination function may be a function for combining the second code behind the first code. As detailed codes included in the virtual code for authentication are increased, the detailed code combination function may be variously generated.

The virtual code for primary authentication generated as described above is transmitted to the device 20 for generating a virtual code for authentication.

The code generation unit 262 of the device 20 for generating a virtual code for authentication may generate a virtual code for secondary authentication by using the virtual code for primary authentication (S130).

Prior to step S130, the code generation unit 262 of the device 20 for generating a virtual code for authentication may first determine whether to generate the virtual code for secondary authentication based on the type of smart card device 10. More specifically, the code generation unit 262 may perform the determination operation based on received card data along with the virtual code for primary authentication (according to an embodiment, the card data may be received upon tagging). That is, the code generation unit 262 may determine whether the smart card device 10 is a card for access control or a card for financial settlement based on the card data. Furthermore, the code generation unit 262 may not generate a virtual code for secondary authentication if it is confirmed that the smart card device 10 is a card for access control, and may generate a virtual code for secondary authentication if it is confirmed that the smart card device 10 is a card for financial settlement based on the card data.

According to an embodiment, whether to generate a virtual code for secondary authentication may be determined based on the type of device 20 for generating a virtual code for authentication. Specifically, if the device 20 for generating a virtual code for authentication is an access control device, a virtual code for secondary authentication may not be generated without the determination operation. If the device 20 for generating a virtual code for authentication is a user terminal, the code generation unit 262 may determine whether to generate a virtual code for secondary authentication based on the type of smart card device 10. More specifically, the code generation unit 262 may perform the determination operation based on received card data along with a virtual code for primary authentication (according to an embodiment, the card data may be received upon tagging). That is, the code generation unit 262 may not generate a virtual code for secondary authentication if it is confirmed that the smart card device 10 is a card for access control based on the card data, and may generate a virtual code for secondary authentication if it is confirmed that the smart card device 10 is a card for financial settlement based on the card data.

The code generation unit 262 has been described as performing the determination operation, but the present disclosure is not limited thereto. Another component of the processor 260 may perform the determination operation.

When it is determined that the virtual code for secondary authentication is generated through the process, in step S130, the code generation unit 262 may generate the virtual code for secondary authentication by using the virtual code for primary authentication. In this case, in order to generate the virtual code for secondary authentication, first, the server 30 needs to perform verification on the virtual code for primary authentication. The server 30 may extract a plurality of detailed codes (the first code and the second code) included in the virtual code for primary authentication through the verification, and may transfer the plurality of detailed codes to the device 20 for generating a virtual code for authentication.

The verification for the virtual code for primary authentication for generating the virtual code for secondary authentication has been described as being performed by the server 30. According to an embodiment, the device 20 for generating a virtual code for authentication not the server 30 may perform corresponding verification. A method of verifying a virtual code for authentication is described later.

In this specification, a method of generating the virtual code for secondary authentication may be divided into a method of performing an OTP operation once and a method of performing an OTP operation twice.

In the method of performing an OTP operation once (first method), the OTP operation is performed only when the smart card device 10 generates a virtual code for primary authentication, and a code length of a virtual code for secondary authentication is increased.

In the first method, the code generation unit 262 may generate a third code by excluding second UID, that is, identification information of the device 20 for generating a virtual code for authentication, from the received first code by using a second function for generating a virtual code for authentication. In this case, the second UID is data stored in the device 20 for generating a virtual code for authentication, and is a unique value capable of identifying the device 20 for generating a virtual code for authentication.

The third code=the first code−the second UID

Thereafter, the code generation unit 262 may generate the virtual code for secondary authentication by combining the first code generated by the smart card device 10, the second code generated by the smart card device 10, and the third code generated by the device 20 for generating a virtual code for authentication by using the second function for generating a virtual code for authentication.

The code generation unit 262 may generate the virtual code for secondary authentication by combining the plurality of generated detailed codes (the first code, the second code, and the third code). As an embodiment, the code generation unit 262 may generate the virtual code for secondary authentication by combining the plurality of detailed codes according to a specific rule by using the second function for generating a virtual code for authentication. The second function for generating a virtual code for authentication may include a rule (i.e., the detailed code combination function) by which the plurality of detailed codes is combined. The aforementioned methods may be applied as a method of generating one virtual code for authentication by combining the plurality of detailed codes.

In the first method, all the first code and second code included in the virtual code for primary authentication and the first code and second code included in the virtual code for secondary authentication mean the same codes generated by the smart card device 10. The third code is newly generated by the device 20 for smart authentication and combined with the first code and the second code, thus generating the virtual code for secondary authentication.

In the method of performing an OTP operation twice (second method), when the smart card device 10 generates the virtual code for primary authentication, an OTP operation is performed. Thereafter, when the device 20 for generating a virtual code for authentication generates the virtual code for secondary authentication, an OTP operation is performed once again. A code length of the virtual code for secondary authentication is not changed (i.e., the same as the length of the virtual code for primary authentication).

In the second method, the code generation unit 262 may generate a second OTP based on the virtual code for primary authentication, and may generate the virtual code for secondary authentication based on the second OTP and the second UID, that is, identification information of the device for generating a virtual code for authentication. In this case, the second UID is data stored in the device 20 for generating a virtual code for authentication, and is a unique value capable of identifying the device 20 for generating a virtual code for authentication.

The code generation unit 262 may generate the second OTP by further using, as additional seed data, the virtual code for primary authentication in addition to the time data and a secret value by using the second function for generating a virtual code for authentication.

Thereafter, the code generation unit 262 may generate a first code by adding the generated second OTP to time data (the time data may be timing at which the generation of the virtual code for secondary authentication has been requested) included in the first code generated by the smart card device 10 by using the second function for generating a virtual code for authentication. The code generation unit 262 may generate a second code by excluding a second user identification (UID), that is, identification information of the device 20 for generating a virtual code for authentication, from the first code by using the second function for generating a virtual code for authentication. In this case, the second UID is data stored in the device 20 for generating a virtual code for authentication, and is a unique value capable of identifying the device 20 for generating a virtual code for authentication.

The first code=the time data+the second OTP

The second code=the first code−the second UID

In this case, the time data is time data at current timing. The time data that is used when the virtual code for primary authentication is generated and the time data that is used when the virtual code for secondary authentication may be the same. That is, the first OTP and the second OTP may the same current time data because they are generated at the same timing.

The code generation unit 262 may generate the virtual code for secondary authentication by combining the generated detailed codes (the first code and the second code). As an embodiment, the code generation unit 262 may generate the virtual code for secondary authentication by combining a plurality of detailed codes according to a specific rule by using the second function for generating a virtual code for authentication. The second function for generating a virtual code for authentication may include a rule (i.e., a detailed code combination function) by which the plurality of detailed codes is combined. The aforementioned methods may be applied as a method of generating one virtual code for authentication by combining the plurality of detailed codes.

In the second method, the first code and second code included in the virtual code for primary authentication and the first code and second code included in the virtual code for secondary authentication are generated by the smart card device 10 and the device 20 for generating a virtual code for authentication, respectively, and are different codes. That is, the first code and second code included in the virtual code for primary authentication are generated by using the first OTP and the first UID. The first code and second code included in the virtual code for secondary authentication are generated by using the second OTP and the second UID. Accordingly, the first code and second code included in the virtual code for primary authentication and the first code and second code included in the virtual code for secondary authentication are different from each other.

The first function for generating a virtual code for authentication and the second function for generating a virtual code for authentication are stored in the smart card device 10 and the device 20 for generating a virtual code for authentication, respectively, but the first timing at which the first function is driven and the first timing at which the second function is driven may be the same. That is, when a user has the smart card device 10 issued thereto and completes user registration for the smart card device 10 with the server 30 through the first tagging on the device 20 for generating a virtual code for authentication, the first function for generating a virtual code for authentication and the second function for generating a virtual code for authentication, which are stored in the smart card device 10 and the device 20 for generating a virtual code for authentication, respectively, may start their driving. That is, the first function for generating a virtual code for authentication and the second function for generating a virtual code for authentication may be the same.

When the user registration is completed as described above, at least one of the first UID, that is, identification information of the smart card device 10, and the second UID, that is, identification information of the device 20 for generating a virtual code for authentication, may be stored in the server. That is, the server 30 may store at least one of the first UID and the second UID in an area that is allocated to the user within a verification algorithm upon user registration. According to an embodiment, the server 30 may store the first UID in one area, and may store the second UID in the one area by matching the second UID with the first UID. According to an embodiment, the server 30 may store the second UID in one area, and may store the first UID in the one area by matching the first UID with the second UID. According to an embodiment, the server 30 may store the first UID and the second UID in two areas, respectively.

Furthermore, upon user registration, the server 30 may also store card data related to the smart card device 10 and terminal data related to the device 20 for generating a virtual code for authentication, in addition to the first UID and the second UID.

The communication unit 22 of the device 20 for generating a virtual code for authentication may transmit at least one of the virtual code for primary authentication and the virtual code for secondary authentication to the server (S140).

The verification request unit 264 of the device 20 for generating a virtual code for authentication may request the server 30 to perform verification on the at least one (S150).

According to an embodiment, if the smart card device 10 is an access card for access control, that is, when a user accesses a specific space that requires security offline by using the smart card device 10 or logs in to a specific website or app online, the server 30 may receive a verification request for the virtual code for primary authentication. Specifically, the virtual code for primary authentication generated by the smart card device 10 may be autonomously transmitted to the server 30 and may be used for user authentication.

Referring to FIG. 6, the device 20 for generating a virtual code for authentication (more specifically, the verification request unit 264) may request verification by transmitting, to the server 30, the virtual code for primary authentication generated by the smart card device 10. The server 30 may perform the verification on the virtual code for primary authentication based on the verification algorithm, and may transmit a result of the verification to the device 20 for generating a virtual code for authentication.

In this case, the device 20 for generating a virtual code for authentication may request verification by directly transferring the virtual code for primary authentication to the server 30, but may output the virtual code for primary authentication to a display unit (not illustrated) so that a user can visually check or copy the virtual code for primary authentication and input or attach the virtual code for primary authentication to another program or webpage. The device 20 for generating a virtual code for authentication may request the verification by transmitting, to the server 30, the virtual code for primary authentication inputted or attached by the user.

The device 20 for generating a virtual code for authentication may perform user authentication upon offline access control and online login based on a result of the verification. That is, if the virtual code for primary authentication is a normal code, a user may be permitted to access the specific space that requires security or to log in to the specific website or app.

According to an embodiment, if the smart card device 10 is a card for financial settlement, that is, when a user performs financial transactions by using the smart card device 10, the server 30 may receive a verification request for the virtual code for secondary authentication. That is, the virtual code for primary authentication, which is generated by the smart card device 10, may be transmitted to the device 20 for generating a virtual code for authentication, and may be used to generate the virtual code for secondary authentication.

Referring to FIG. 7, the device 20 for generating a virtual code for authentication (more specifically, the code generation unit 262) may generate the virtual code for secondary authentication by using the virtual code for primary authentication, which is generated by the smart card device 10. The device 20 for generating a virtual code for authentication (more specifically, the verification request unit 264) may request verification by transmitting the generated virtual code for secondary authentication to the server 30. The server 30 may perform the verification on the virtual code for secondary authentication based on the verification algorithm, and may transmit a result of the verification to the device 20 for generating a virtual code for authentication.

In this case, the device 20 for generating a virtual code for authentication may request the verification for the virtual code for primary authentication from the server 30 in order to obtain seed data for generating the virtual code for secondary authentication. The server 30 may extract at least one of the first code, the second code, the time data, the secret value, and the first UID from the virtual code for primary authentication based on the verification algorithm, and may transfer the at least one to the device 20 for generating a virtual code for authentication. The device 20 for generating a virtual code for authentication may generate the virtual code for secondary authentication by using at least one of the first code, the second code, the time data, the secret value, the first UID, and the virtual code for primary authentication as seed data. As described above, the verification for the virtual code for primary authentication for generating the virtual code for secondary authentication may be performed by the server 30. However, according to an embodiment, the device 20 for generating a virtual code for authentication may directly perform the corresponding verification.

The device 20 for generating a virtual code for authentication may perform user authentication upon financial settlement based on a result of the verification. That is, if the virtual code for secondary authentication is a normal code, a user may perform financial transactions.

Hereinafter, a method of verifying a virtual code for authentication is specifically described.

According to an embodiment, when the server 30 receives a verification request for the virtual code for primary authentication, the server 30 may extract the first UID by searching an area in which the first UID has been stored based on the virtual code for primary authentication by using a verification algorithm corresponding to the first function for generating a virtual code for authentication.

In this case, as described above, the virtual code for primary authentication includes a plurality of detailed codes. The plurality of detailed codes may include a first code that sets a start point of search for an area where the first UID is stored and a second code that sets a search path from the start point to the area where the first UID is stored according to a specific search method.

The first code and the second code have a correlation for verifying the virtual code for primary authentication within the server 30 including means for verifying a virtual code for authentication. However, the smart card device 10 including the means for generating a virtual code for authentication includes the first function for generating the first code and the second function for generating the second code as detailed code generation functions in order to increase security, and may not include data for the correlation between the first code and the second code.

Furthermore, as an embodiment, if the virtual code for primary authentication is generated as a combination of the first code and the second code according to a specific rule, the first code and the second code may perform respective roles each for searching an area where an actual value (the first UID) is stored within the verification algorithm. For example, the first code sets a start point of search for a storage location, and the second code sets a search path from the start point to the storage area of the first UID according to a specific search method. Accordingly, thereafter, when the smart card device 10 provides a virtual code for authentication generated normally every unit count, the server 30 determines, as an area in which the first UID has been stored, a point that has been moved along the search path corresponding to the second code from the start point corresponding to the first code.

Specifically, the server 30 may extract a plurality of detailed codes included in the virtual code for primary authentication by using the verification algorithm. The virtual code for primary authentication is generated by combining the plurality of detailed codes according to a specific rule. The server 30 may extract the plurality of detailed codes from the virtual code for primary authentication by applying the same function as a detailed code combination function that is used when the virtual code for primary authentication is generated. For example, if a virtual code for primary authentication in which two detailed codes (i.e., a first code and a second code) have been combined is generated, the server 30 may separate the first code and the second code from a letter array of the virtual code for primary authentication by applying the detailed code combination function. In this case, the detailed codes may include a correlation.

If a virtual code for primary authentication includes a first code and a second code, as an embodiment in which detailed codes have a correlation, the server 30 may determine a start point of search corresponding to the first code, and may consider, as the first UID, a value corresponding to a point moved along a search path corresponding to the second code from the start point of search.

Furthermore, as another embodiment, as the smart card device 10 provides a new virtual code for primary authentication every unit count, the server 30 may set a start point and a search path based on a first code and a second code changed for each count, and may search for the first UID.

Furthermore, as an embodiment, the server 30 may include a verification algorithm in order to search for the first UID by using a plurality of detailed codes having a correlation. The verification algorithm is an algorithm that enables the first UID to be searched for when each of detailed codes included in the virtual code for primary authentication is applied. For example, if a first code that determines a start point of search for the first UID from the virtual code for primary authentication and a second code that presents a direction of a storage area from the start point are included, the verification algorithm is an algorithm that adjusts the first UID to be disposed at a corresponding location corresponding to the second code at a point corresponding to the first code. As the verification algorithm is used, the server 30 may search for the first UID although the first code and second code included in the virtual code for primary authentication are changed.

Furthermore, as an embodiment, if the virtual code for primary authentication is generated by combining the first code obtained by adding the first OTP to the time data and the second code obtained by excluding the first UID from the first code, the server 30 may extract an actual value (i.e., the first UID) by subtracting a second code value from a first code value.

Furthermore, as an embodiment, the server 30 may compare the first UID extracted by searching the storage area and the first UID extracted by subtracting a second code value from a first code value, and may determine that the virtual code for primary authentication is a normal code when the two values are the same. However, even without such a comparison process, the server 30 may determine whether a corresponding virtual code for primary authentication is a normal code based on only each value (e.g., determine whether a corresponding virtual code for primary authentication is a normal code by determining whether an extracted value is identical with information stored in a DB of the server 30).

According to an embodiment, when receiving a verification request for a virtual code for secondary authentication, the server 30 may extract at least one of the first UID and the second UID by searching an area in which the first UID has been stored and an area in which the second UID has been stored based on the virtual code for secondary authentication by using a verification algorithm corresponding to the second function for generating a virtual code for authentication.

In the first method, the virtual code for secondary authentication is generated by combining the first code, the second code, and the third code as described above. The server 30 may extract the first UID by searching the area in which the first UID has been stored and extract the second UID by searching the area in which the second UID has been stored, based on the virtual code for secondary authentication by using the verification algorithm corresponding to the second function for generating a virtual code for authentication.

The server 30 may extract a plurality of detailed codes included in a virtual code for secondary authentication by using a verification algorithm. The virtual code for secondary authentication is generated by combining the plurality of detailed codes according to a specific rule. The server 30 may extract the plurality of detailed codes from the virtual code for secondary authentication by applying the same function as a detailed code combination function used when the virtual code for secondary authentication is generated. For example, if a virtual code for secondary authentication in which three detailed codes (i.e., a first code, a second code, and a third code) have been combined is generated, the server 30 may separate the first code, the second code, and the third code from a letter array of the virtual code for secondary authentication by applying a detailed code combination function. In this case, the detailed codes may have a correlation.

If a virtual code for secondary authentication includes a first code, a second code, and a third code, as an embodiment in which the detailed codes have a correlation, the server 30 may determine a start point of search corresponding to the first code, and may consider, as the first UID, a value corresponding to a point moved along a search path corresponding to the second code from the start point of search. Furthermore, the server 30 may determine a start point of search corresponding to the first code, and may consider, as the second UID, a value corresponding to a point moved along a search path corresponding to the third code from the start point.

Furthermore, as another embodiment, as the device 20 for generating a virtual code for authentication provides a new virtual code for secondary authentication every unit count, the server 30 may set a start point and a search path based on a first code, a second code, and a third code changed for each count, and may search the first UID and the second UID.

Furthermore, as an embodiment, in order to search for the first UID and the second UID by using a plurality of detailed codes having a correlation, the server 30 may include a verification algorithm. The verification algorithm is an algorithm which enables the first UID to be searched for and the second UID to be searched for when each detailed code included in a virtual code for secondary authentication is applied. For example, if a first code that determines start points of search for the first UID and the second UID from a virtual code for secondary authentication, a second code that presents a direction of a storage area of the first UID from the start point, and a third code that presents a direction of a storage area of the second UID from the start point are included, a verification algorithm is an algorithm adjusted so that the first UID is disposed at a corresponding location when a direction corresponding to the second code is indicated at a point corresponding to the first code and adjusted so that the second UID is disposed at a corresponding location when a direction corresponding to the third code is indicated at a point corresponding to the first code. As the verification algorithm is used, the server 30 can search for the first UID and the second UID although the first code, the second code, and the third code included in the virtual code for secondary authentication are changed.

Furthermore, as an embodiment, if the virtual code for secondary authentication is generated by combining the first code obtained by adding the first OTP to the time data, the second code obtained by excluding the first UID from the first code, and the third code obtained by excluding the second UID from the first code, the server 30 may extract an actual value (i.e., the first UID) by subtracting a second code value from a first code value, and may extract an actual value (i.e., the second UID) by subtracting a third code value from the first code value.

That is, the server 30 may extract the first UID based on the first code and the second code and perform verification on the smart card device 10, and may extract the second UID based on the first code and the third code and perform verification on the device 20 for generating a virtual code for authentication.

Furthermore, as an embodiment, the server 30 may compare first UID extracted by searching for the storage area and first UID extracted by subtracting the second code value from the first code value, may complete primary verification for the virtual code for secondary authentication (i.e., verification for the smart card device) when the two values are the same, may compare second UID extracted by searching for the storage area and second UID extracted by subtracting the third code value from the first code value, may complete secondary verification for the virtual code for secondary authentication (i.e., verification for the device for generating a virtual code for authentication) when the two values are the same, and may determine that the virtual code for secondary authentication is a normal code. However, even without such a comparison process, the server 30 may determine that a corresponding virtual code for secondary authentication is a normal code (e.g., determines whether a corresponding virtual code for secondary authentication is a normal code by determining whether an extracted value is identical with information stored in the DB of the server 30).

In the second method, the virtual code for secondary authentication is generated by combining the first code and the second code generated based on the second OTP and the second UID generated based on the virtual code for primary authentication as described above. The server 30 may perform verification on the virtual code for secondary authentication by comparing a second OTP included in a received virtual code for secondary authentication and a second OTP for verification. In this case, the second OTP for verification may be generated by the server 30 based on the same seed data as seed data used when the second OTP is generated.

Specifically, the server 30 may separate the first code and the second code from the virtual code for secondary authentication, and may confirm card data (e.g., a secret value) stored together by searching for the second UID based on the separated first code and second code. In this case, a method of separating the detailed codes and searching for an actual value by using the detailed codes has been described above.

Thereafter, the server 30 may search for first UID matched with the retrieved second UID.

The server 30 may generate extracted values through the second UID as described above, that is, the secret value and the first UID, and the virtual code for primary authentication by using current time data, and may generate the second OTP for verification by using the generated virtual code for primary authentication, the secret value, and the time data as seed data.

As described above, the server 30 compares the generated second OTP for verification and the second OTP included in the second virtual code for authentication. When the two values are the same, the server 30 may determine that the second virtual code for authentication is a normal code. That is, when the second OTP and the second OTP for verification are the same, all values (the virtual code for primary authentication, the secret value, and the time data) used as the seed data are the same. Furthermore, when virtual codes for primary authentication are the same, virtual codes for secondary authentication generated based on corresponding values are the same. Accordingly, the smart card device 10 and the device 20 for generating a virtual code for authentication can be verified as being normal.

Hereinafter, a user authentication method based on a virtual code for authentication, which is performed by the smart card device 10, is described in detail with reference to FIG. 8.

Referring to FIG. 8, the smart card device 10 may receive time data from the device for generating a virtual code for authentication through card tagging (S210), and may generate a virtual code for primary authentication based on the received time data (S220).

What the smart card device 10 generates the virtual code for primary authentication, what the device 20 for user authentication generates the virtual code for secondary authentication, and what the server 30 performs verification on at least one of the virtual code for primary authentication and the virtual code for secondary authentication are redundant with those described with reference to FIGS. 1 to 7, and detailed descriptions thereof are omitted.

The smart card device 10 of the present disclosure may perform functions for financial settlement and access control together. That is, if the smart card device 10 is a company credit card of a company or a personal card of an employee, each user may use a corresponding card as an access card of a company.

The steps illustrated in FIGS. 4 and 8 have been described as being sequentially executed, but this merely exemplarily describes the technology spirit of the present embodiment. A person having ordinary knowledge in the art to which the present embodiment pertains may execute the steps described in FIGS. 4 and 8 by changing the sequence of the steps or may apply one or more steps by variously modifying and changing the one or more steps in a way to execute the one or more steps in parallel within a range that does not deviate from the intrinsic characteristic of the present embodiment. Accordingly, the steps described in FIGS. 4 and 8 is not limited to a time-series sequence.

The aforementioned present disclosure may further provide a computer-readable recording medium on which a computer program for executing the method of generating a virtual code for authentication is recorded.

The aforementioned program may include a code coded in a computer language, such as C, C++, JAVA, or a machine language readable by a processor (CPU) of a computer through a device interface of the computer in order for the computer to read the program and execute methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The steps of the method or algorithm described in relation to the embodiments of the present disclosure may be directly implemented as hardware, may be implemented as a software module executed by hardware, or may be implemented by a combination of them. The software module may reside in a random access memory (RAM), a read only memory (ROM), an erasable programmable ROM (EPROM), an electrically erasable programmable ROM (EEPROM), a flash memory, a hard disk, a detachable disk, a CD-ROM, or a computer-readable recording medium having a given form, which is well known in the field to which the present disclosure pertains.

Although the embodiments of the present disclosure have been described with reference to the accompanying drawings, a person of ordinary knowledge in the art to which the present disclosure pertains may understand that the present disclosure may be implemented in other detailed forms without changing the technical spirit or essential characteristics of the present disclosure. Accordingly, it is to be understood that the aforementioned embodiments are only illustrative, but are not limitative in all aspects.

The invention claimed is:

1. A method performed by a device for generating a virtual code for authentication, comprising:
transmitting time data to a card upon tagging of the card in which an IC chip has been embedded;
receiving, from the card, a virtual code for primary authentication generated based on the time data;

generating a virtual code for secondary authentication by using the virtual code for primary authentication;
transmitting at least one of the virtual code for primary authentication and the virtual code for secondary authentication to a server; and
requesting the server to perform verification on the at least one of the virtual code for primary authentication and the virtual code for secondary authentication,
wherein:
the virtual code for primary authentication comprises a plurality of codes;
a first code of the plurality of codes is generated based on the time data and a first OTP (one-time password); and
a second code of the plurality of codes is generated by excluding, from the first code, first user identification (UID) which is identification information of the card, and
wherein the generating the virtual code for secondary authentication comprises:
generating a third code by excluding, from the first code, second user identification UID, that is, identification information of the device for generating a virtual code for authentication;
and generating the virtual code for secondary authentication by combining the first code, the second code, and the third code.

2. The method of claim 1, wherein:
verification is performed on the card based on the first code and the second code; and
verification is performed on the device for generating a virtual code for authentication based on the first code and the third code.

3. The method of claim 1, wherein the generating the virtual code for secondary authentication further comprises:
generating a second OTP (one-time password) based on the virtual code for primary authentication; and
generating the virtual code for secondary authentication based on the second OTP and second UID which is identification information of the device for generating a virtual code for authentication.

4. A method performed by a device for generating a virtual code for authentication, comprising:
transmitting time data to a card upon tagging of the card in which an IC chip has been embedded;
receiving, from the card, a virtual code for primary authentication generated based on the time data;
generating a virtual code for secondary authentication by using the virtual code for primary authentication;
transmitting at least one of the virtual code for primary authentication and the virtual code for secondary authentication to a server; and
requesting the server to perform verification on the at least one of the virtual code for primary authentication and the virtual code for secondary authentication,
wherein:
the virtual code for primary authentication comprises a plurality of codes;
a first code of the plurality of codes is generated based on the time data and a first OTP (one-time password) and
a second code of the plurality of codes is generated by excluding, from the first code,
first user identification (UID) which is identification information of the card,
wherein the generating the virtual code for secondary authentication comprises:
generating a second OTP (one-time password) based on the virtual code for primary authentication; and
generating the virtual code for secondary authentication based on the second OTP and second user identification UID which is identification information of the device for generating a virtual code for authentication, and
wherein:
the virtual code for secondary authentication is verified by comparing the second OTP included in the virtual code for secondary authentication and the second OTP for verification; and
the second OTP for verification is generated by the server based on seed data identical with seed data used when the second OTP is generated.

5. The method of claim 1, wherein the virtual code for primary authentication is used for user authentication upon offline access control and online login.

6. The method of claim 1, wherein the virtual code for secondary authentication is used for user authentication upon financial settlement.

7. The method of claim 1, wherein the time data has a form combined with an application protocol data unit (APDU) command.

8. A non-transitory computer-readable recording medium storing a computer program, and configured to be coupled to a computer hardware, the program includes instructions to execute a method performed by a device for generating a virtual code for authentication, the method comprising:
transmitting time data to a card upon tagging of the card in which an IC chip has been embedded;
receiving, from the card, a virtual code for primary authentication generated based on the time data;
generating a virtual code for secondary authentication by using the virtual code for primary authentication;
transmitting at least one of the virtual code for primary authentication and the virtual code for secondary authentication to a server; and
requesting the server to perform verification on the at least one of the virtual code for primary authentication and the virtual code for secondary authentication,
wherein:
the virtual code for primary authentication comprises a plurality of codes;
a first code of the plurality of codes is generated based on the time data and a first OTP (one-time password); and
a second code of the plurality of codes is generated by excluding, from the first code, first user identification (UID) which is identification information of the card and
wherein the generating the virtual code for secondary authentication comprises:
generating a third code by excluding, from the first code, second user identification UID, that is, identification information of the device for generating a virtual code for authentication;
and
generating the virtual code for secondary authentication by combining the first code, the second code, and the third code.

9. A device for generating a virtual code for authentication, comprising:
a processor coupled to memory, further comprising:
a communication unit configured to transmit time data to a card upon tagging of the card in which an IC chip has been embedded and receive, from the card, a virtual code for primary authentication generated based on the time data;

a code generation unit configured to generate a virtual code for secondary authentication by using the virtual code for primary authentication; and a verification request unit configured to request a server to perform verification on at least one of the virtual code for primary authentication and the virtual code for secondary authentication by transmitting the at least one of the virtual code for primary authentication and the virtual code for secondary authentication to the server through the communication unit, wherein:

the virtual code for primary authentication comprises a plurality of codes;

a first code of the plurality of codes is generated based on the time data and a first OTP (one-time password); and a second code of the plurality of codes is generated by excluding, from the first code, first user identification (UID) which is identification information of the card, and wherein the code generation unit is further configured to, in generating the virtual code for secondary authentication:

generate a third code by excluding, from the first code, second user identification UID, that is, identification information of the device for generating a virtual code for authentication; and generate the virtual code for secondary authentication by combining the first code, the second code, and the third code.

* * * * *